United States Patent [19]

Nasu

[11] Patent Number: 4,956,157
[45] Date of Patent: Sep. 11, 1990

[54] PROCESS FOR SEPARATING SALTS IN SEAWATER

[76] Inventor: Atsushi Nasu, 99 Katako, Yokaichiba-shi, Chiba-ken, Japan

[21] Appl. No.: 358,158

[22] Filed: May 30, 1989

[30] Foreign Application Priority Data

Feb. 20, 1989 [JP] Japan .................................. 1-40092

[51] Int. Cl.$^5$ ................................. B01D 9/02
[52] U.S. Cl. ..................................... 423/104; 210/724;
210/726; 210/737; 210/912; 159/47.1;
159/DIG. 23; 203/10; 203/35; 203/36; 203/37;
203/48; 23/296; 23/300; 423/164; 423/167;
423/178
[58] Field of Search ............... 210/724, 726, 737, 752,
210/774, 806, 716, 717, 912; 23/296, 300;
62/532; 203/10, 35, 36, 37, 48; 423/164, 167,
320, 178, 104; 159/47.1, DIG. 23

[56] References Cited

U.S. PATENT DOCUMENTS

| | | | |
|---|---|---|---|
| 1,697,336 | 1/1929 | Yngve | 23/296 |
| 1,894,514 | 1/1933 | Hechenbleikner | 423/320 |
| 2,587,001 | 2/1952 | Seailles | 423/164 |
| 3,262,865 | 7/1966 | Waters, Jr. | 210/724 |
| 4,755,303 | 7/1988 | Sweat | 210/724 |

FOREIGN PATENT DOCUMENTS 59102492  12/1982  Japan ..................................... 203/10

Primary Examiner—Peter Hruskoci
Assistant Examiner—Krisanne Shideler
Attorney, Agent, or Firm—Lorusso & Loud

[57] ABSTRACT

A process for obtaining available elements from seawater is described, which process includes two separation steps. The first separation step involved adjusting the pH of seawater to a low pH by adding a strong acid having sulphate ion, adding a strongly alkaline agent thereto in amount sufficient to provide a high pH and separating the precipitate formed thereby from the filtrate. The second separation step involves concentrating the filtrate, cooling the concentrated filtrate and separating a precipitate thereby formed. Each precipitate and each filtrate obtained in these steps has characteristic components and can be utilized for many purposes, for example, for food additives, as a solvent for paint, as combustion aids, or as alkaline agents for neutralization etc.

7 Claims, No Drawings

PROCESS FOR SEPARATING SALTS IN SEAWATER

BACKGROUND OF THE INVENTION

1. Field of the Invention

This invention relates to a process for separating salts in seawater which contains useful metal ions.

2. Related Art Statement

It is well known that there are many chemical elements such as Na, Cl, various metals and halogens in seawater. But only a few elements such as Na, Cl, Mg, Br are obtained from seawater as a mineral source heretofore.

Raw salts are obtained from seawater by evaporation and used for many purposes. But excessive energy is necessary in the evaporation because it requires phase-change of water. Further, the raw salts have to be purified or prepared for each purpose. In addition to evaporation, reverse-osmosis is carried, out for desalinization of seawater. The reverse-osmosis is carried out by using a large scale and expensive apparatus such as a high-pressure pump or reverse-osmosis modules. Moreover these processes of desalinization of seawater don't seek to utilize the available elements from seawater but only to desalt seawater.

SUMMARY OF THE INVENTION

The drawbacks attendant to the prior art as described above have been successfully overcome by the present invention.

Accordingly, an object of this invention is to provide a simple process to collect available elements from seawater as a precipitate. Another object of this invention is to provide a process to obtain a solution containing other elements seawater, which solution may be desalinated.

To accomplish the above object the process for separating salts from seawater of the present invention comprises two steps. The first step involves adjusting the pH of seawater to a low pH by adding a strong acid containing sulphate ion, adding thereto a strongly alkaline agent to provide a high pH and separating precipitate formed thereby from the seawater.

The remaining seawater is further treated in the second step. The second step comprises concentrating the remainiing seawater, cooling it and separating a precipitate which forms upon cooling.

DETAILED DESCRIPTION OF PREFERRED EMBODIMENTS

First, a strong acid containing sulphate ion is added to seawater to obtain a low pH. Here a dilute solution of several % sulfuric acid can be used as the strong acid containing sulphate ion. An acidic solution obtained by adding 3-5% of sulfuric acid to an aqueous solution of activated calcium phosphate and removing a precipitate therefrom (P-S acid) is preferrably used. the P-S acid is a strong acid having a pH of about 0.2, but this acid is very mild to human skin and easily treated, in contrast with sulfuric acid. In the course of 2-3 hours after adding the diluted sulfuric acid or the P-S acid to seawater, the pH of the seawater is adjusted to a low pH not more than 2. A precipitate, only a very small amount of which is deposited, is removed by filtration together with other materials suspended in the seawater.

Next, a stongly alkaline agent is added to the pH-adjusted seawater to neutralize and to adjust to a high pH. By adding a strongly alkaline agent to the seawater, salts such as sulphates of alkali earth metals, and other metals the solubility of which decrease in a high pH, precipitate. Sodium hydroxide (solid) or a aqueous solution containing both calcium oxide and sodium hydroxide (Ca-Na solution) or the like is used as the strongly alkaline agent. The strongly alkaline agent is used in an amount sufficient to provide a ph of 13 or more. Usually sodium hydroxide (solid) is used in an amount about 3% of the seawater and Ca-Na solution is used in an amount about 5% of the seawater. In the course of several hours after adding the alkali, the seawater will have a pH 13 or above and a precipitate(a) is formed.

The precipitate (a) contains Ca, K, Mg and a significant amount of Al, B, Fe, Zn, etc. by elemental analysis of the wet precipitate. As shown in table 1, Mg, Al, B, Fe, Zn increased significantly by this separation compared to the amounts of these elements in natural seawater.

Accordingly, the precipitate(a) can be utilized as a source of these metals and itself has many uses as an alkaline agent including use as a source of metal ions.

On the other hand, the seawater after removing the precipitate(a) contains mainly Cl ion as anion. This remaining seawater can be used for a combustion aids utilizing seawater, which the applicant of this invention developed (Japanese Laid-open Patent Publication No. 63- 225695).

Moreover in the second step the remaining seawater is further treated to form a precipitate(b) and a remaining solution(c) by concentrating the remaining seawater and cooling it.

In this second separation step, the remaining seawater is concentrated to 10%-30% of its original volume, preferably 10%-15% and then cooled. By cooling, white a crystalline precipitate (b) starts to separate immediately.

The salts contained in (b) include, as main components, Na, Mg, Ca and a significant amount of Si. The salts (b) can be utilized as a source of Si and an aqueous solution of the salt may be utilized for food additives or another purpose. It has been reported that silicon prompts absorption of calcium or magnesium in the human body. Accordingly, the food additives utilizing the salts(b) have the benefits of not only improvement of the taste of foods or drinks but also high nutrition. Moreover, it has been verified that foods containing salts(b) have a high antibacterial activity.

Remaining seawater(c), after removing the salts(b), contains Na, and K as main components and Ca, Si and Li as minor components. This remaining seawater(c) has high pH (more than 14) and may be used for any purpose as an alkaline agent instead of NaOH or the like. For example, it is used for neutralization of acidic waste oils or a acidic sewage from a paper plant. It is also used for separating oil components from a mixture of petroleum and seawater present around the engine of a ship.

Moreover, this alkaline solution(c) may be utilized as a solvent for paints such as an epoxy paint or an acrylic paint, which have heretofore been dissolved in toluene or lacquer-thinner.

The white residue is obtained by evaporation. This process is carried under reduced pressure if necessary. The residue is estimated to be salts, oxides or hydroxides of K, Na, and Ca etc. based on elemental analysis.

A container of high resistance to alkali should be used for evaporating water from the solution by heating.

According to the present invention, elements available in seawater are collected in solid state by only adjusting the pH of seawater stepwise and the components of the solids obtained in each step have characteristics to be utilized for various purposes after appropriate treatment or as it is.

EXAMPLE

1. Preparation of P-S acid

An aqueous solution (1) having a pH value of over than 13 was obtained by adding 50 g of a alkaline agent to 1 liter of water. The alkaline agent used herein was a powdery agent containing mainly calcium phosphate and calcium oxide obtained by baking bones. P-S acid having a pH of 0.2 was obtained by adding sulfuric acid to the solution (1) to make a 5% sulfuric acid solution.

2. Preparation of Ca-Na solution

An aqueous solution (2) having a pH value of over than 13 was obtained by dissolving 30 g of a powdery alkaline agent in 1 liter of seawater. The powdery alkaline agent used herein was a powdery agent containing mainly calcium oxide obtained by firing limestones. A Ca-Na solution was prepared by dissolving 5% of NaOH(solid) in the solution(2).

3. Separation of salts in seawater (First step)

3 hours after adding 10 liter of aforementioned P-S acid to 500 liter of seawater, insoluble materials were removed by filtration. By this treatment, the pH of the seawater became 1.6. Next, 25 liter of Ca-Na solution was added to 500 liter of the seawater of low pH. After standing for 10 hours, the precipitate thereby formed was separated by filtration and sun-dried. As a result about 20 kg of solid salts(a) were obtained. The pH of the remaining seawater was 9.1. Results of elemental-analysis of the solid salts(a) and the remaining seawater are listed in tables 1 & 2.

It is evident from the results that elements such as Mg, Al, Cu, Fe, Zn etc. were collected in the precipitate(a) from seawater.

4. Separation of salts in the remaining seawater (Second step)

10 liters of the remaining seawater obtained in the first step were concentrated to about 15% of the original volume by heating.

The concentrated seawater was cooled in a water bath. Then crystalline salts started to form immmediately. These salts(b) were separated by filtration.

The dry weight of the salts(b) was 200 g. Results of elemental-analysis of the salts(b) and the filtrate were listed on the table 3 & 4. As shown in table 3 & 4, the salts are Si-rich salts and the remaining solution contains few cations besides Na, K and Ca.

5. Examples of utilization (1) The remaining sweater after removing the precipitate(a) in first separation step was used for producing combustion aids which the applicant developed. These combustion aids were obtained by adding a strongly alkaline agent containing mainly calcium oxide to the aforementioned seawater, dissolving therein a mixture of oils, a strongly alkaline agent containing mainly calcium oxide and a little amount of water and removing insoluble materials therefrom. The combustion aids thus obtained were effective for reducing fuel costs and cleaning the exhaust gas when sprayed into internal combustion engines.

Further, clogging of fuel supply system was reduced excellently when these combustion aids were used, compared with the combustion aids prepared by using untreated seawater.

(2) An ionic water for food or drinks was obtained by dissolving 5 g of aforementioned salts(b) in 1 liter of water. Noodles have a very good taste were made by kneading flour with the ionic water. The noodles were not putrefied after storage at 8° C. for 2 weeks.

TABLE 1

| Elements | Precipitate (mg/l) | Seawater (mg/l) |
| --- | --- | --- |
| Ca | 590 | 401 |
| k | 390 | 380 |
| Mg | 4320 | 1300 |
| Na | 12200 | 10500 |
| S | 1310 | 900 |
| Al | 327 | 0.01 |
| B | 13.9 | 4.8 |
| Cr | 0.08 | 0.00005 |
| Cu | 0.02 | 0.0006 |
| Fe | 2.07 | 0.01 |
| Mn | 0.07 | 0.002 |
| Si | 6.4 | 3 |
| Sr | 4.7 | 8 |
| Zn | 13.7 | 0.001 |

TABLE 2

|  | Remaining Seawater | Seawater (natural) |
| --- | --- | --- |
| Cl (mg/l) | 17200 | 18980 |
| K (mg/l) | 350 | 380 |
| Na (g/l) | 11.5 | 10.556 |
| $Ca^2$ (mg/l) | 300 | 401 |
| $Mg^2$ (mg/l) | 250 | 1272 |

TABLE 3

Elements in salts (b) obtained in second step (mg/kg)

| Ca | 2030 | Al | 33.5 | Mn | 1.39 |
| --- | --- | --- | --- | --- | --- |
| K | 4770 | B | 169 | Si | 697 |
| Mg | 6.10(%) | Cr | 2.78 | Sr | 194 |
| Na | 33.7(%) | Cu | 5.66 | Zn | 2.09 |
| S | 3.81(%) | Fe | 17.8 | Li | 8.93 |

TABLE 4

Elements in filtrate obtained in second step (mg/kg)

| Ca | 13.2 | Al | — | Mn | — |
| --- | --- | --- | --- | --- | --- |
| K | 3840 | B | — | Si | 2.32 |
| Mg | Trace | Cr | — | Sr | 0.04 |
| Na | 14.8(%) | Cu | — | Zn | — |
| S | 7560 | Fe | — | Li | 2.92 |

We claim:
1. Process for separating metal salts from seawater comprising:
(a) adding an acid containing sulphate and phosphate ions to the seawater in amount sufficient to lower the pH of the seawater to 2.0 or less;
(b) adding an alkaline agent to the seawater with lowered pH in an amount sufficient to raise the pH of the seawater to 13 or more, thereby forming a first precipitate of metal salts;

(c) separating said first precipitate from the seawater and collecting the remaining seawater as a first solution;

(d) concentrating and cooling said first solution to form a second precipitate of metal salts;

(e) separating the second precipitate and recovering the remaining solution as a second solution; and (f) evaporating said second solution to dryness thereby forming a residue of metal salts.

2. A process according to claim 1 wherein a precipitate forms in step (a) and further comprising separating from the seawater the precipitate formed in step (a) and feeding the remaining seawater to step (b).

3. A process in accordance with claim 1 wherein said alkaline agent is NaOH.

4. A process in accordance with claim 1 wherein said alkaline agent is an aqueous solution of calcium oxide and sodium hydroxide.

5. A process in accordance with claim 1 wherein, in step (d), said first solution is concentrated to 10–30% of the volume collected in step (c).

6. A process in accordance with claim 1 wherein, in step (d), said first solution is concentrated to 10–15% of the volume collected in step (c).

7. A process in accordance with claim 1 wherein:
said first precipitate contains salts of Ca, K, Mg, Al, B, Fe and Zn;
said second precipitate contains salts of Na, Mg, K, Ca and Si; and
said residue contains salts, oxides or hydroxides of K, Na and Ca.

* * * * *

UNITED STATES PATENT AND TRADEMARK OFFICE
CERTIFICATE OF CORRECTION

PATENT NO. : 4,956,157
DATED : September 11, 1990
INVENTOR(S) : Atsushi NASU

It is certified that error appears in the above-identified patent and that said Letters Patent is hereby corrected as shown below:

IN THE SPECIFICATION:

Col. 1, line 20, after "carried" delete the comma ",";

line 47, "remainiing" should read --remaining--;

line 58, "the" should read --The--.

Col. 2, line 26, delete "a";

line 40, after "Mg" insert --K--;

line 42, "salt" should read --salts--; and line 51, after "Na" delete the comma ",".

Col. 3, line 36, after "result" insert a comma --,--; and line 60, "sweater" should read --seawater--.

Signed and Sealed this

Twenty-fourth Day of December, 1991

Attest:

HARRY F. MANBECK, JR.

Attesting Officer        Commissioner of Patents and Trademarks